United States Patent Office 3,573,286
Patented Mar. 30, 1971

3,573,286
PYRIDOXAL DERIVATIVES AND
PRODUCTION THEREOF
Hisanao Zenno, Nishinomiya, Akira Sugihara, Osaka, and Sinji Tsubouchi, Kyoto, Japan, assignors to Fujisawa Pharmaceutical Co., Ltd., Osaka, Japan
No Drawing. Filed June 14, 1967, Ser. No. 645,902
Claims priority, application Japan, June 29, 1966, 41/42,614; July 2, 1966, 41/43,089; July 8, 1966, 41/44,555; July 11, 1966, 41/45,544; July 26, 1966, 41/49,195; Sept. 30, 1966, 41/64,528; Oct. 3, 1966, 41/65,052
Int. Cl. C07d 31/30
U.S. Cl. 260—240
7 Claims

ABSTRACT OF THE DISCLOSURE

This disclosure teaches novel pyridoxylideneamine derivatives representable by the following formula:

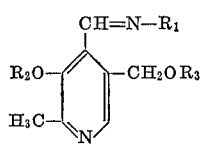

wherein $R_1$ is alkyl substituted or unsubstituted with carboxy, lower alkoxy, lower alkylthio, lower alkoxycarbonyl, aryl, carbamoyl or 5- or 6-membered heterocyclyl containing one or two hetero atom(s) selected from the group consisting of N, O and S, or aryl substituted or unsubstituted with carboxy, lower alkyl, lower alkoxy, lower alkylthio, lower alkoxycarbonyl, carbamoyl or halogen; $R_2$ is acyl; $R_3$ is hydrogen, acyl or phosphono, their intermediates and process for preparing the same. The pyridoxylideneamine derivatives and their intermediates are useful compounds having Vitamin $B_6$ activity.

This invention relates to certain pyridoxal derivatives and production thereof. More particularly, it relates to new pyridoxylideneamine derivatives, their intermediates and processes for preparing the same.

It is an object of this invention to provide new and useful pyridoxal derivatives having Vitamin $B_6$ activity.

It is also an object of this invention to provide processes for preparing the pyridoxylideneamine derivatives and their intermediates.

These and other objects will be apparent from the following description.

In accordance with this invention, the pyridoxylideneamine derivatives are generically representatable by the formula:

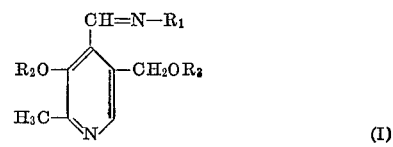

(I)

wherein $R_1$ is alkyl substituted or unsubstituted with carboxy, lower alkoxy, lower alkylthio, lower alkoxycarbonyl, aryl, carbamoyl or 5- or 6-membered heterocyclyl containing one or two hetero atom(s) selected from the group consisting of N, O and S, or aryl substituted or unsubstituted with carboxy, lower alkyl, lower alkoxy, lower alkylthio, lower alkoxycarbonyl, carbamoyl or halogen; $R_2$ is acyl; $R_3$ is hydrogen, acyl or phosphono.

The pyridoxylideneamine derivatives (I) may be prepared by the following reaction schemes.

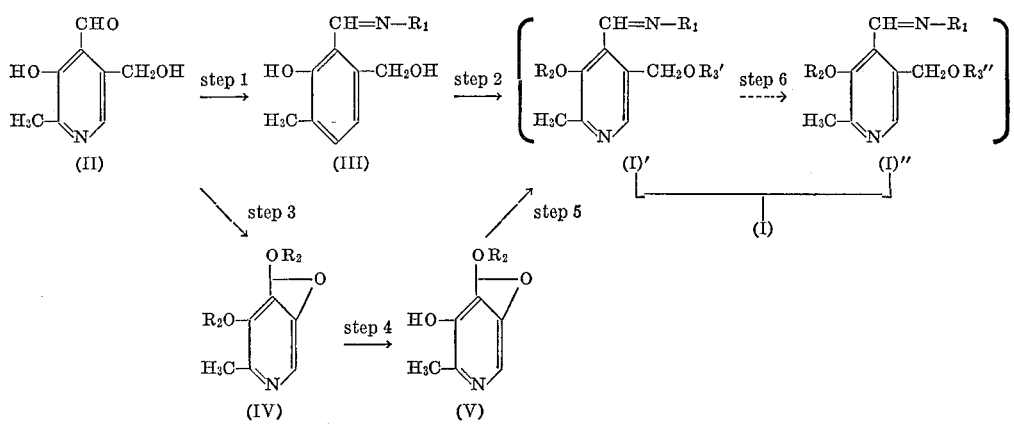

wherein $R_1$ and $R_2$ are each as defined above; $R_3'$ is hydrogen or acyl; $R_3''$ is acyl or phosphono.

In the above and subsequent description, specific examples of each substituents are as follows:

Alkyl: lower alkyl having not more than 6 carbon atoms (e.g. methyl, ethyl, propyl, isopropyl, butyl, 3-methylpropyl, pentyl, 4-methylbutyl, hexyl, allyl, propenyl, crotonyl, etc.) and higher alkyl having more than 7 carbon atoms (e.g. helptyl, isoheptyl, octyl, isooctyl, decyl, dodecyl, tetradecyl, pentadecyl, octadecyl, etc.);

Aryl: (e.g. phenyl, naphthyl, etc.);

Lower alkoxycarbonyl: one having not more than 7 carbon atoms (e.g. methoxycarbonyl, ethoxycarbonyl, propoxycarbonyl, butoxycarbonyl, etc.);

Lower alkoxy; one having not more than 6 carbon atoms (e.g. methoxy, ethoxy, propoxy, isopropoxy, butoxy, allyloxy, etc.);

Lower alkylthio: one having not more than 6 carbon atoms (e.g. methylthio, ethylthio, propylthio, etc.);

Halogen: one having not more than 80 in atomic weight (e.g. fluorine, chlorine, bromine);

5- or 6-membered heterocyclyl containing one or two hetero atom(s) selected from the group consisting of N, O and S: (e.g. furfuryl, pyridine-2-methyl, pyrazole-2-ethyl, 4-methyloxazole-5-ethyl, thiophene-2-methyl, 2-methylthiazole-4-methyl, etc.).

Acyl: aromatic acyl [such as aryloyl substituted or unsubstituted with carboxy, lower alkyl, lower alkoxy, lower alkylthio, lower alkoxycarbonyl, carbamoyl or halogen (e.g. benzoyl, naphthoyl, o- or m-carboxybenzoyl, o- or p-toluyl, o- or p-methoxybenzoyl, p-ethoxybenzoyl, o- or p-methylthiobenzoyl, p-ethylthiobenzoyl, p-methoxycarbonylbenzoyl, p-ethoxycarbonylbenzoyl, m- or p-carbamoylbenzoyl, o-, m- or p-chlorobenzoyl, etc.)] or aliphatic acyl [such as lower alkanoyl having not more than 7 carbon atoms (e.g. acetyl, propionyl, butyryl, isobutyryl, valeryl, 3-methylbutyryl, caproyl, 4-methylcaproyl, etc.), higher alkanoyl having more than 8 carbon atoms (e.g. capryloyl, lauryl, palmityl, stearyl, etc.), lower alkenoyl having not more than 7 carbon atoms (e.g. acryloyl, crotonoyl, vinylacetyl, etc.), lower alkoxycarbonyl, lower alkoxy (lower) alkanoyl (e.g. methoxyacetyl, ethoxyacetyl, methoxypropionyl, etc.) or 5- or 6-membered heterocyclylcarbonyl containing one or two hetero atom(s) selected from the group consisting of N, O and S (e.g. nicotinoyl, piperazine-1-carbonyl, morpholine-4-carbonyl, pyrrole-2-carbonyl, furan-2-carbonyl, thiophene-2-carbonyl, isoxazole-3-carbonyl, isothiazole-3-carbonyl, etc.)];

Aryloyl: (e.g. benzoyl, naphthoyl, etc.).

In the study of various types of Vitamin $B_6$ derivatives and their pharmacological activities, the inventors found that the pyridoxylideneamine derivatives (I) of this invention are possessed of excellent properties in comparison with so-called Vitamin $B_6$ itself and known derivatives thereof. That is, the pyridoxylideneamine derivatives (I) have the following characteristics:

(1) They show the same activity as Vitamin $B_6$, and furthermore,
(2) They exhibit much higher blood concentration on Vitamin $B_6$,
(3) Such high blood concentration level is longer-lasting, and
(4) They show much lower toxicity.

The characteristics mentioned above are also shown by such new intermediates of said pyridoxyideneamine derivatives (I), for example, as the compound of the formula:

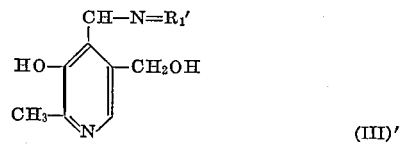

(III)′ wherein $R_1'$ is alkyl substituted with carboxy, lower alkoxy, lower alkylthio, lower alkoxycarbonyl, carbamoyl, or 5- or 6-membered heterocyclyl containing one or two hetero atom(s) selected from the group consisting of N, O and S, or aryl substituted with carboxy, lower alkylthio, lower alkoxycarbonyl or carbamoyl, the compound of the formula:

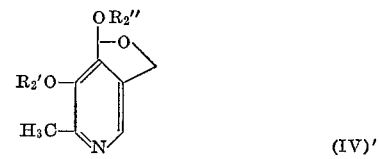

(IV)′ wherein $R_2'$ and $R_2''$ are same or different an acyl selected from the group consisting of aryloyl substituted or unsubstituted carboxy, lower alkyl, lower alkoxy, lower alkylthio, lower alkoxycarbonyl, carbamoyl or halogen, lower alkanoyl having not more than 7 carbon atoms, lower alkenoyl having not more than 7 carbon atoms, lower alkoxycarbonyl, lower alkoxy (lower) alkanoyl, and 5- or 6-membered heterocyclylcarbonyl containing one or two hetero atom(s) selected from the group consisting of N, O and S, and the compound of the formula:

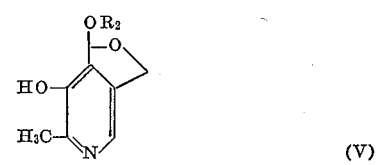

(V)

wherein $R_2$ is as defined in the Formula I hereinbefore.

Some of the pharmacological tests, of which the results will support the before mentioned characteristics, are set forth below.

(1) Vitamin $B_6$ activity and blood concentration (1) Utilization for Vitamin $B_6$ in a living body of the representative compounds of this invention, was observed, using three weeks old male mice of Wister strain, on their body weight increase after breeding with pyridoxine hydrochloride and the test compounds respectively contained in a Vitamin $B_6$ deficient feed.

Pyridoxine hydrochloride in a dose of $50\gamma$ a day and each of the test compounds in a dose corresponding to $50\gamma$ of pyridoxine hydrochloride, were respectively administered to mice.

The test compounds used in this experiment were 4-[N-(p-ethoxycarbonylphenyl)formimidoyl]-5-acetoxy-6-methyl-pyridinemethanol, 4-[N-(p-ethoxycarbonylphenyl)formimidoyl]-5-isobutyryloxy-6-methylpyridinemethanol, 4-(N-phenylformimidoyl)-5-isobutyryloxy-6-methylpyridinemethanol, 1,7-diisobutyryloxy-6-methyl-1,3-dihydrofuro[3,4-c]pyridine and 1,7-diacetoxy-6-methyl-1,3-dihydrofuro[3,4-c]-pyridine.

The Vitamin $B_6$ deficient feed consisted of the ingredients listed up herebelow and was given to mice in a dose of 10 g. a day. In this experiment, the group of mice given each of the test compounds contained in the Vitamin $B_6$ deficient feed, showed a similar body weight increasing curve to the group of mice given pyridoxine hydrochloride.

From the result, it is concluded that each of the test compounds is utilized in living bodies as Vitamin $B_6$ as well as pyridoxine hydrochloride.

Ingredients of the feed:

Vitamins-free casein—1200 g.
Glucose—3100 g.
Soy bean oil—500 g.
McCollum's salt—200 g.
Nicotinic acid—100 mg.
Calcium pantothenate—100 mg.
Vitamin $B_1$—20 mg.
Vitamin $B_2$—30 mg.
Vitamin $B_{12}$—500 $\gamma$
Vitamin A—90 mg.

Vitamin D—400 γ
P-aminobenzoic acid—250 mg.
Folic acid—2.5 mg.
Choline chloride—5 g.
Biotin—500 γ
Inositol—1.5 g.
Water—150 cc.

(2) Vitamin $B_6$ activity (the growth promoting activity for a microorganism) and blood concentration after oral administration to mice were respectively measured on the representative compounds of this invention by a bioassay according to the Fukui's method, the results of which are shown in Table I.

TABLE I

| Compound | $VB_6$ activity, percent [1] | Blood concentration of $VB_6$ (mγ/cc.) [2] | | | | | |
|---|---|---|---|---|---|---|---|
| | | After 30 mins. | After an hour | After 2 hrs. | After 4 hrs. | After 6 hrs. | After 24 hrs. |
| Pyridoxine hydrochloride [3] | 100 | 2,100 | 1,700 | 1,200 | 900 | 500 | 400 |
| Pyridoxal hydrochloride [3] | γ | 4,800 | 3,700 | 1,800 | 1,000 | 600 | |
| Pyridoxal palmitate [3] | 0 | | | | | | |
| 3,4-diisobutyryloxymethyl-5-isobutyryloxy-6-methylpyridine [2] | 0 | | | 940 | 680 | 600 | 320 |
| 4-[N-(4-ethoxycarbonylphenyl)formimidoyl]-5-hydroxy-6-methyl-3-pyridinemethanol | 95 | 7,000 | 5,000 | 4,000 | 2,200 | | |
| 4-(N-phenylformimidoyl)-5-acetoxy-6-methyl-3-pyridinemethanol | 106 | | | 6,720 | 4,670 | 4,220 | |
| 4-(N-phenylformimidoyl)-5-isobutyryloxy-6-methyl-3-pyridinemethanol | 101 | 4,300 | 3,580 | 2,950 | 2,760 | 2,500 | 1,700 |
| 4-[N-(4-ethoxycarbonylphenyl)formimidoyl]-5-acetoxy-6-methyl-3-pyridinemethanol | 100 | 4,000 | 6,400 | 5,500 | 4,500 | 4,000 | 2,400 |
| 4-[N-(4-ethoxycarbonylphenyl)formimidoyl]-5-isobutyryloxy-6-methyl-3-pyridinemethanol | 98 | 1,850 | 3,200 | 5,400 | 4,580 | 4,100 | 1,680 |
| 4-(N-phenylformimidoyl)-5-benzoyloxy-6-methyl-3-pyridinemethanol | 115 | | | 1,960 | 1,680 | 1,120 | |
| 1-acetoxy-6-methyl-7-hydroxy-1,3-dihydrofuro[3,4-c]pyridine | 100 | | | 6,800 | 4,320 | 2,390 | 1,870 |
| 1-isobutyryloxy-6-methyl-7-hydroxy-1,3-dihydrofuro[3,4-c]pyridine | 100 | 4,000 | 6,200 | 5,600 | 4,900 | 2,410 | 1,420 |
| 1-(3-methylbutyryloxy)-6-methyl-7-hydroxy-1,3-dihydrofuro[3,4-c]pyridine hydrochloride | | 7,200 | 3,900 | 5,600 | 2,600 | 2,400 | |
| 1,7-diacetoxy-6-methyl-1,3-dihydrofuro[3,4-c]pyridine | 102 | 4,500 | 6,700 | 8,000 | 10,000 | 5,480 | 3,800 |
| 1,7-dipropionyloxy-6-methyl-1,3-dihydrofuro[3,4-c]pyridine | 100 | 3,400 | 3,700 | 6,560 | 4,000 | 2,460 | 1,570 |
| 1,7-diisobutyryloxy-6-methyl-1,3-dihydrofuro[3,4-c]pyridine | 104 | 4,440 | 7,390 | 5,180 | 4,500 | 2,580 | 1,920 |
| 1,7-di-(3-methylbutyryloxy)-6-methyl-1,3-dihydrofuro[3,4-c]pyridine | 100 | 5,400 | 7,300 | 5,000 | 3,800 | 3,000 | 1,390 |
| 1-ethoxycarbonyloxy-6-methyl-7-isobutyryloxy-1,3-dihydrofuro [3,4-c]pyridine hydrochloride | | 5,100 | 5,300 | 4,100 | 2,900 | 2,300 | 2,000 |

[1] $VB_6$ activity of the test compound is represented by the percentage on that of pyridoxine hydrochloride used in equimoleqular.
[2] The administrative dose (mg. kg.) to rat of the test compound is corresponding to 5 mg./kg. or pyridoxine hydrochloride.
[3] The compounds are known ones.

(2) Acute toxicity

The 0.1% methyl cellulose suspension of the compound to be tested was given to male mice weighing 16–19 g. of dd-strain. The value of $LD_{50}$ was calculated according to the Van der Waerden method. The results on some of the representative compounds of this invention are shown in Table II.

TABLE II

| Compound | LD (mg./kg.) | |
|---|---|---|
| | p.o. | s.c. |
| Pyridoxal hydrochloride | 1,135.5 | 387.3 |
| 4-(N-phenylformimidoyl)-5 isobutyryloxy-6 methyl-3-pyridinemethanol | 4,241 | >6,000 |
| 4-[N-(p-ethoxycarbonylphenyl) formimidoyl] 5-acetoxy-6-methyl-3-pyridinemethanol | >4,000 | >4,000 |
| 4-[N-(p-ethoxycarbonylphenyl)-formimidoyl]-5-isobutyryloxy-6-methyl-3-pyridinemethanol | >4,000 | >3,000 |

The pyridoxal derivatives of this invention can be incorporated and administered externally and internally for the therapeutical use in per se conventional preparation form.

Examples of the composition for internal use include solid compositions such as tablets, pills, capsules, dispersible powders and granules, and liquid compositions such a injectable solution, orally administrable solutions, suspensions and syrups. One of the suitable compositions for internal administration may be tablets in which at least one of the pyridoxal derivatives of this invention is admixed with an inert diluent (e.g. lactose, calcium stearate) in the presence of a disintegrator (e.g. potato starch, cellulose calcium glycolate) and a lubricant (e.g. magnesium stearate). Dosage for internal use is about 1–100 mg. for adult a day. These dosages, however, depend on the condition, body weight, etc. of the patient, and a large amount administration such as about 200 mg. for adult a day, may be applied according to the kind of diseases.

The composition for external use may be mentioned solutions, suspensions, sprays, ointments, creams and the like. One of the suitable compositions for external administration may be ointments in which at least one of the pyridoxal derivatives of this invention as the active ingredient is incorporated in a base (e.g. fats, lanoline, vaseline, wax, glycols, higher alcohols, glycerine, etc.), if necessary, admixed with other agent(s) used in pharmaceutical or cosmetic field.

The pyridoxylideneamine derivatives (I) can be prepared by the procedures as illustrated in the preceding scheme; that is;

Procedure (A) which comprises reacting pyridoxal (II) or its acid addition salt with a primary organic amine of the formula: $R_1$—$NH_2$ (wherein $R_1$ is as defined before) or its acid addition salt, acylating thus obtained 4-formimidoyl-5-hydroxy-3-pyridine derivatives (III) with an acylating agent and then, if needed, treating the resultant compound with an acylating agent or a phosphorylating agent, to obtain the pyridoxylideneamine derivatives (I);

Procedure (B) which comprises acylating pyridoxal (II), or its acid addition salt with an acylating agent, hydrolysing the obtained 1,7-diacyloxy-1,3-dihydrofuro-[3,4-c]pyridine derivatives (IV), treating the resultant 1 - acyloxy-7-hydroxy-1,3-dihydrofuro[3,4-c]pyridine derivatives (V) with a primary organic amine of the formula: $R_1$—$NH_2$ (wherein $R_1$ is as defined before) or its acid addition salt and then, if needed treating the resultant compound with an acylating agent or a phosphorylating agent, to obtain the pyridoxylideneamine derivatives (I).

The step shown in the scheme and some steps modified therefrom will be each hereinafter illustrated in detail.

STEP 1

This step is concerned with production of 4-formimidoyl-5-hydroxy-3-pyridinemethanol derivatives (III).

The reaction of this step can be carried out by treating pyridoxal (II) or its acid addition salt with a primary organic amine or its acid addition salt.

The primary organic amine or its acid addition salt used in this reaction can be referred to the disclosure on the Step 5 hereinbelow.

The reaction may be effected in water or a hydrophilic inert solvent (e.g. methanol, ethanol, dioxane, etc.) alkalified with an alkaline agent referring to the disclosure on the Step 5.

The 4-formimidoyl-5-hydroxy-3-pyridinemethanol derivatives (III) obtained in the reaction can be converted into the corresponding inorganic and organic acid addition salts (e.g. hydrochloride, hydrobromide, sulfate, acetate, propionate, tartrate, succinate, etc.), according to the conventional method.

The compound (III) may be used for the Step 2 in the form of a reaction mixture as just prepared without refinement.

The following example is given for the illustrative of the embodiment of the Step 1 in this invention.

Example (1)-1

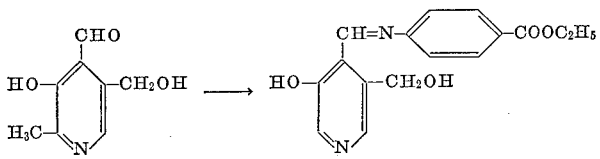

Pyridoxal hydrochloride (800 g.) was dissolved in water (4000 cc.). To this solution cooled at 7° C., was added dropwise a solution of ethyl p-aminobenzoate hydrochloride (648 g.) in 95% ethanol with stirring at 7–10° C. taking 10 minutes. The mixture was added with sodium bicarbonate (376 g.) to adjust a pH to 8.0 keeping the mixture at 10–12° C. and then stirred for 30 minutes. The precipitating crystals were collected by filtration and washed with water to give 4-[N-(p-ethoxycarbonylphenyl) formimidoyl]-5-hydroxy - 6 - methyl-3-pyridinemethanol as reddish yellow refine needles decomposing at 196–200° C.

*Analysis.*—Calculated for $C_{17}H_{18}N_2O_4$ (percent): C, 64.95; H, 5.77; N, 8.91. Found (percent): C, 65.21; H, 6.03; N, 8.51.

In the substantially same manner as the above example, the following compounds were obtained:

4-[N-(p-carboxyphenyl)formimidoyl]-5-hydroxy-6-methyl-3-pyridinemethanol, reddish yellow refine crystals, M.P. 243° C. (decomp.), 4-[N - (p - methoxyphenyl)formimidoyl]-5-hydroxy-6-methyl-3-pyridinemethanol, yellow crystals, M.P. 216–217° C.

4-[N - (p - chlorophenyl)formimidoyl] - 5 - hydroxy-6-methyl-3-pyridinemethanol, faint yellow needles, M.P. 229° C. (decomp.), 4-[N - (p-tolyl)formimidoyl] - 5 - hydroxy-6-methyl-3-pyridinemethanol, yellow needles, M.P. 226–227° C. (decomp.), 4-[N - (2-methylpropyl)formimidoyl] - 5 - hydroxy-6-methyl-3-pyridinemethanol, yellow refine crystals, M.P. 67–68° C., 4-(N - phenylformimidoyl) - 5 - hydroxy-6-methyl-3-pyridinemethanol, yellow refine crystals, M.P. 173–174° C., 4 - (N - benzylformimidoyl)-5-hydroxy-6-methyl-3-pyridinemethanol, yellow crystals, M.P. 114–115° C.

STEP 2

This step is concerned with the conversion of 4-formimidoyl-5-hydroxy-3-pyridinemethanol derivatives (III) into 4-formimidoyl-5-acyloxy-3-pyridinemethanol derivatives (I)':

The conversion can be carried out by treating 4-formimidoyl-5-hydroxy-3-pyridinemethanol derivatives (III) or its acid addition salt with an acylating agent.

As an acylating agent, there are mentioned an organic acid or its reactive derivative at carboxy radical, lower alkyl haloformate or a mixture of a carbonyl dihalide and a lower alkanol.

The organic acid used as an acylating agent in this reaction is an aromatic carboxylic acid such as aryl carboxylic acid, wherein the aryl may be substituted or unsubstituted with carboxyl, lower alkyl, lower alkoxy, lower alkylthio, lower alkoxycarbonyl, carbamoyl or halogen [e.g. benzoic acid, α- or β-naphthoic acid, benzene dicarboxylic acid (m- or o-phthalic acid, etc.), lower alkyl-substituted benzoic acid (o- or p-toluic acid, etc.), lower alkoxy-substituted benzoic acid (o- or p-methoxybenzoic acid, p-ethoxybenzoic acid, etc.), lower alkylthio-substituted benzoic acid (o- or p-methylthiobenzoic acid, p-ethylthiobenzoic acid, etc.), lower alkoxycarbonyl-substituted benzoic acid (p-methoxycarbonylbenzoic acid, p-ethoxycarbonylbenzoic acid, etc.), m- or o-carbamoylbenzoic acid, halobenzoic acid (m-, o- or p-chlorobenzoic acid, etc.), etc.]; or aliphatic carboxylic acid such as lower alkanoic acid having not more than 7 carbon atoms (e.g. acetic acid, propionic acid, butyric acid, isobutyric acid, valeric acid, 3-methylbutyric acid, caproic acid, etc.), higher alkanoic acid having more than 8 carbon atoms (e.g. caprylic acid, lauric acid, palmitic acid, stearic acid, etc.), lower alkenoic acid having not more than 7 carbon atoms (e.g. acrylic acid, crotonic acid, vinylacetic acid, etc.), lower alkoxy (lower)alkanoic acid (e.g. methoxyacetic acid, ethoxyacetic acid, methoxypropionic acid, etc.) or 5- or 6-membered heterocyclic carboxylic acid containing one or two hetero atoms(s) selected from the group consisting of N, O and S (e.g. nicotinic acid, piperazine - 1 - carboxylic acid, morpholine-4-carboxylic acid, pyrrole-2-carboxylic acid, furan-2-carboxylic acid, thiophene-2-carboxylic acid, isoxazole-3-carboxylic acid, isothiazole-3-carboxylic acid, etc.).

The specific examples of an organic acid reactive derivatives at carboxy radical are acid halide (e.g. chloride, bromide, etc.), acid anhydride, mixed anhydride (e.g. one with alkylsulfate, alkylcarbonate, etc.), acid azide, acid amide and acid ester, of which acid chloride and anhydride are used conveniently.

As lower alkyl haloformate, there are exemplified methyl chloroformate, bromoformate and iodoformate, ethyl chloroformate and bromoformate, propyl chloroformate and bromoformate, isopropyl chloroformate and bromoformate, butyl chloroformate, 2-methylpropyl chloroformate, etc.

As carbonyl dihalide, there are mentioned carbonyl dichloride, dibromide, chloride bromide and difluoride, etc.

As lower alkanol, there are mentioned methanol ethanol, propanol, isopropanol, butanol, etc.

An acylating agent may be adequately chosen according to the kind of acyl radical to be introduced and/or the compound to be acylated.

In this conversion, when using an organic acid as an acylating agent, the conversion may be advantageously effected under the presence of a condensing agent such as dicyclohexylcarbodiimide, N - cyclohexyl - N' - morpholinoethylcarbodiimide, pentamethyleneketene - N-cyclohexylimine, N - ethyl - o - phenylisoxazolium-3'-sulfonate, polyphosphoric acid ester, etc.

An inert solvent (e.g. ether, benzene, toluene, xylene, chloroform, carbontetrachloride, chloromethane, dichloromethane, petroleum ether, petroleum benzine, ligroin, tetrahydrofuran, dioxane, water, etc.) may be employed as the reaction medium. Water is recommendable to be used in the mixture with a hydrophilic solvent such as dioxane or tetrahydrofuran.

The reaction may be ordinally effected under mild conditions such as with cooling, warming or at room temperature.

In the conversion, an acylating agent is considered to attack first the hydroxy radical at the 5th position of pyridine nucleus and then the hydroxymethyl radical at the 3rd position. Production of mono- and diacylated compounds may depend on the kind of the starting compound (III), an acylating agent to be used, a solvent and/or reaction conditions.

If necessary, 4 - formimidoyl - 5-acyloxy-3-pyridinemethanol derivatives (I)' produced in this step may be converted into the corresponding inorganic or organic acid addition salts (e.g. hydrochloride, hydrobromide, sulfate, acetate, propionate, tartrate, succinate, etc.), according to the conventional method.

The compound (I)' may be used for the Step 6 in the form of a reaction mixture as just prepared without refinement.

The following examples are given for the illustrative of the embodiment of the Step 2 in this invention.

Examples (2)-1

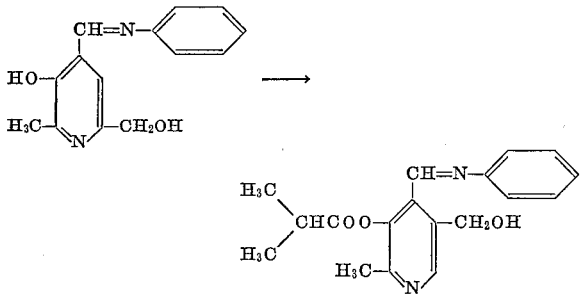

4 - (N - phenylformimidoyl) - 5-hydroxy-6-methyl-3-pyridinemethanol (5.0 g.) was dissolved in a mixture of pyridine (250 cc.) and chloroform (125 cc.). The solution was added dropwise to a solution of isobutyryl chloride (4.4 g.) in chloroform (62 cc.) under cooling at 3–5° C. with stirring taking an hour. The mixture was stirred for 30 minutes at the same temperature and further for an hour at room temperature. After the reaction was completed, the reaction mixture was poured into ice-water (1500 cc.) and the chloroform layer was separated out to be washed with water, then a 10% sodium hydroxide solution and further with water. The chloroform was distilled off under reduced pressure. The remaining oily substance was treated with ether to crystallize, and the precipitating crystals were recrystallized from a mixture of benzene and petroleum ether to give 4-(N-phenylformimidoyl) - 5 - isobutyryloxy - 6-methyl-3-pyridinemethanol (4.6 g.) as white needles melting at 123–124° C.

Analysis.—Calc'd for $C_{18}H_{20}O_3N_2$ (percent): C, 69.21; H, 6.45; N, 8.97. Found (percent): C, 68.75; H, 6.43; N, 8.81.

Example (2)-2

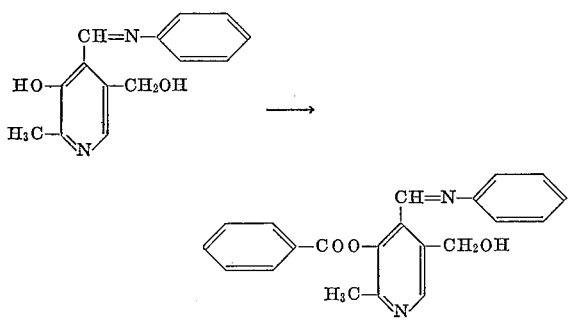

4 - (N - phenylformimidoyl) - 5 - hydroxy-6-methyl-3-pyridinemethanol (2.0 g.) was dissolved in a mixture of pyridine (200 cc.) and chloroform (70 cc.). To this solution was added dropwise a solution of benzoyl chloride (4.6 g.) in chloroform (30 cc.) under cooling at 1–4° C. with stirring taking 80 minutes. The mixture was stirred for an hour at room temperature. After the reaction was completed, the reaction mixture was poured into ice-water. The chloroform layer was separated out and washed with water, a 10% sodium hydroxide solution and further with water. The chloroform was distilled off under reduced pressure. The remaining oily substance was treated with a mixture of ether and petroleum ether to crystallize, and the precipitating crystals were recrystallized from a mixture of benzene and petroleum ether to give 4-(N-phenylformimidoly)-5-benzoyloxy-6-methyl-3-pyridinemethanol (2.8 g.) as white needles melting at 120° C.

Analysis.—Calculated for $C_{21}H_{18}O_3N_2$ (percent): C, 72.82; H, 5.24; N, 8.09. Found (percent): C, 72.90; H, 5.24; N, 8.35.

Example (2)-3

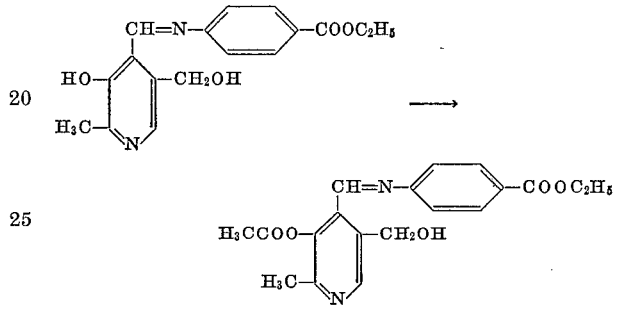

(i) 4 - [N - (p - ethoxycarbonylphenyl)formimidoyl] - 5 - hydroxy - 6 - methyl - 3 - pyridinemethanol (10.0 g.) was suspended in a mixture of pyridine (7.6 g.) and chloroform (150 cc.). To the solution cooled at 1–5° C., was added dropwise acetyl chloride (5.0 g.) with stirring taking 5 minutes. The mixture was stirred at 1–5° C. for 30 minutes and further at room temperature for an hour. After the reaction was completed, the reaction mixture was poured into ice-water (200 cc.). The chloroform layer was separated out and washed with water, a 10% sodium hydroxide solution (100 cc.) and further with water. The solvent was distilled off under reduced pressure to obtain a residue. To the residue was added a small amount of water and the pyridine was distilled off azeotropically with the water. Thus obtained residue was dissolved in ethyl acetate and the solution was dried over anhydrous magnesium sulfate. The solvent was distilled off and the remainder was added with ether. The precipitate was collected by filtration and recrystallized from 99% ethanol to give a 4-[N-(p-ethoxycarbonylphenyl)formimidoyl] - 5 - acetoxy - 6 - methyl - 3-pyridinemethanol (7.8 g.) as refined white needles melting at 163–164° C.

Analysis.—Calculated for $C_{19}H_{20}O_5N_2$ (percent): C, 64.03; H, 5.66; N, 7.86. Found (percent): C, 63.70; H, 5.82; N, 7.82.

(ii) A suspension of 4-[N-(p-ethoxycarbonylphenyl) formimidoyl] - 5 - hydroxy - 6 - methyl - 3 - pyridinemethanol (35 g.) in a mixture of pyridine (2.3 g.) and chloroform (385 cc.) was kept at 1–5° C. To this solution was added dropwise acetic anhydride (14.8 g.) under stirring taking 10 minutes. The mixture was stirred at 1–5° C. for 30 minutes and further at 30° C. for 6 hours. After the reaction was completed, the reaction mixture was poured into ice-water. The chloroform layer was separated out and washed with water, a 10% sodium hydroxide solution (200 cc.) and further with water, after which the solvent was distilled off under reduced pressure. To the residue was added a small amount of water and the pyridine was distilled off azeotropically with the water to obtain crude crystals. These crystals were recrystallized from 99% ethanol to obtain 4-[N-(p-ethoxycarbonylphenyl)formimidoyl] - 5 - acetoxy - 6-methyl-3-pyridinemethanol (30.2 g.) as white refine needles melting at 163–164° C., which was identified with the compound obtained in (i) above, by a mixed examination and an infrared absorption spectrum.

Example (2)–4

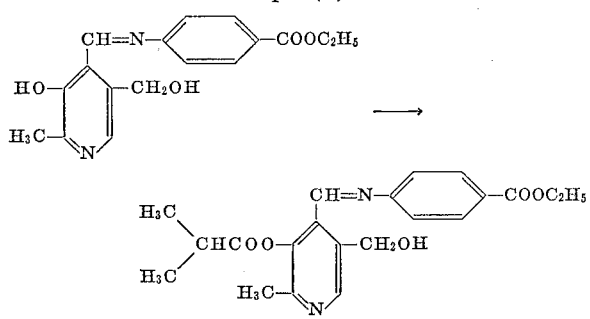

4 - [N - (p - ethoxycarbonylphenyl)formimidoyl] - 5-hydroxy - 6 - methyl - 3 - pyridinemethanol (3.8 g.) was suspended in a mixture of pyridine (180 cc.) and chloroform (100 cc.). To this suspension cooled with an ice, was gradually dropped a solution kept at 2–3° C. of isobutyryl chloride (2.6 g.) in chloroform under stirring taking an hour. The mixture was stirred under cooling with an ice for 30 minutes and further at room temperature for 150 minutes. The reaction mixture was poured into ice-water (500 cc.).

The chloroform layer was separated out and washed with a 10% sodium hydroxide solution and then water. The solvent was distilled off under reduced pressure and a small amount of crystals thus obtained was washed with ether. These crystals were recrystallized from a mixture of benzene and petroleum ether (1:4) to give 4 - [N - (p - ethoxycarbonylphenyl)formimidoyl] - 5-isobutyryloxy - 6 - methyl - 3- pyridine methanol (2.5 g.) as white needles melting at 172–173° C.

*Analysis.*—Calculated for $C_{21}H_{24}N_2O_5$ (percent): C, 65.61; H, 6.29; N, 7.29. Found (percent): C, 65.84; H, 6.38; N, 7.24.

In the substantially same manner as Examples (2)–1 to (2)–4, the following compounds were obtained.

4 - (N-phenylformimidoyl) - 5 - acetoxy - 6 - methyl - 3-pyridinemethanol, white needles, M.P. 146–147° C.,
4 - [N - (2 - methylpropyl)formimidoyl] - 5 - isobutyryloxy - 6 - methyl - 3 - pyridinemethanol, yellow oil; its picrate having M.P. 97–100° C.,
4-[N-(p-ethoxycarbonylmethyl)formimidoyl]-5-isobutyryloxy-6-methyl-3-pyridinemethanol, yellow oil, infra-red absorption spectrum 1740, 1752 cm.$^{-1}$ ($>$CO), 3340 cm.$^{-1}$ (OH),
4-[N-(p-chlorophenyl)formimidoyl]-5-benzoyloxy-6-methyl-3-pyridinemethanol, while crystals, M.P. 125.5–127° C.,
4-[N-(p-ethoxycarbonylphenyl)formimidoyl]-5-benzoyloxy-6-methyl-3-pyridinemethanol, white needles, M.P. 154.5–156° C.,
4-[N-(p-ethoxycarbonylphenyl)formimidoyl]-5-ethoxycarbonyloxy-6-methyl-3-pyridinemethanol, white crystals, M.P. 124–125.5° C.

Example (2)–5

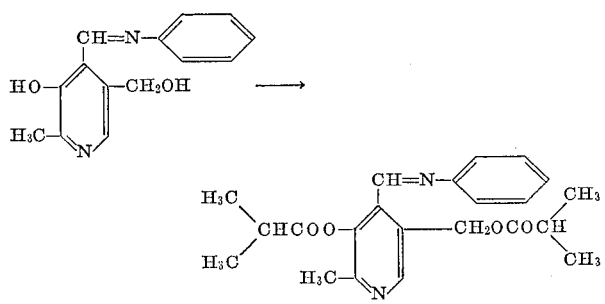

4 - (N-phenylformimidoyl) - 5 - hydroxy-6-methyl-3-pyridinemethanol (1.0 g.) was dissolved in a mixture of pyridine (100 cc.) and chloroform (50 cc.). To this solution was added dropwise a solution of isobutyryl chloride (1.7 g.) in chloroform (25 cc.) with stirring at 3–5° C. taking 30 minutes. The mixture was stirred at room temperature for 30 minutes and further under warming at 50° C. for 40 minutes. After the reaction was completed, the reaction mixture was poured into ice-water.

The chloroform layer was separated out and washed with water, a 10% sodium hydroxide and further with water. The chloroform was distilled off under reduced pressure. The residue was extracted with ether and the extract was washed with water and dried over anhydrous magnesium sulfate, after which the magnesium sulfate was filtered off. The filtrate was distilled off under reduced pressure. The precipitating crystals were washed with petroleum ether and then recrystallized from dilute ethanol to give 3 - isobutyryloxymethyl-4-(N-phenylformimidoyl)-5-isobutyryloxy-6-methylpyridine (1.3 g.) as faint yellow refine needles melting at 75–79° C.

*Analysis.*—Calculated for $C_{22}H_{26}O_4N_2$ (percent): C, 69.09; H, 6.85; N, 7.33. Found (percent): C, 68.83; H, 6.99; N, 7.14.

Example (2)–6

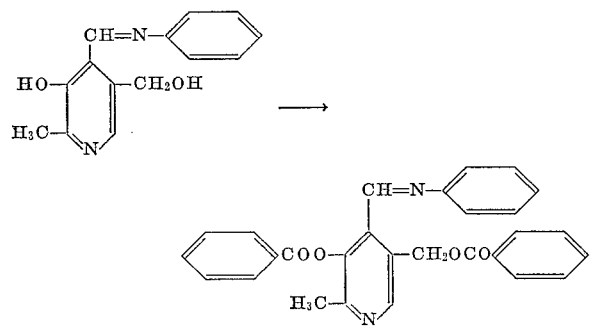

4 - (N-phenylformimidoyl) - 5 - hydroxy-6-methyl-3-pyridinemethanol (1.0 g.) was dissolved in a mixture of pyridine (100 cc.) and chloroform (35 cc.). To this solution was added dropwise benzoyl chloride (2.3 g.) in chloroform (15 cc.) with stirring at 2–3° C. The mixture was stirred at room temperature for 30 minutes and further under warming at 50° C. for 30 minutes. After the reaction was completed, the reaction mixture was poured into ice-water (500 cc.). The chloroform layer was separated out and washed with water, a 10% sodium hydroxide solution and further with water. The solvent was distilled off under reduced pressure. The residue was extracted with ether and the extract was washed with water and then dried over anhydrous magnesium sulfate, after which the magnesium sulfate was filtered off. The filtrate was distilled off under reduced pressure. The residue was cooled and treated with a mixture of ether and ligroin to crystallize. The precipitating crystals were recrystallized from a mixture of benzene and petroleum ether (1:15) to give 3 - benzoyloxymethyl-4-(N-phenylformimidoyl)-5-benzoyloxy-6-methylpyridine (0.7 g.) as white needles melting at 100–101° C.

*Analysis.*—Calculated for $C_2H_{22}O_4N_2$ (percent): C, 74.65; H, 4.92; N, 6.22. Found (percent): C, 74.74; H, 5.06; N, 6.23.

In the substantially same manner as Example (2)–5 or (2)–6, there were obtained the following compounds.

3-isobutyryloxymethyl-4-[N-(2-methylpropylformimidoyl]-5-isobutyryloxy-6-methylpyridine, white refine needles, M.P. 89° C.,
3-acetoxymethyl-4-[N-(p-methoxyphenyl)formimidoyl]-5-acetoxy-6-methylpyridine, a yellow oil, infra-red absorption spectrum; 1760 cm.$^{-1}$, 1779 cm.$^{-1}$ ($>$C=O),
3-methoxyacetoxymethyl-4-[N-(p-tolyl)formimidoyl]-5-methoxyacetoxy-6-methylpyridine, yellow flakes, M.P. 133.5–134.5° C.,
3-nicotinoyloxymethyl-4-(N-benzylformimidoyl)-5-nicotinoyloxy-6-methylpyridine, a yellow oil, infra-red absorption spectrum; 1727, 1745 cm.$^{-1}$ ($>$C=O).

Example (2)-7

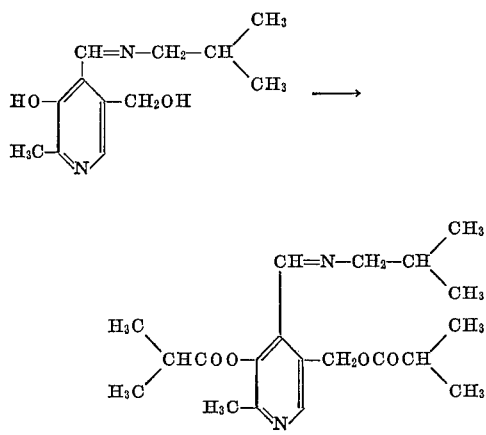

and

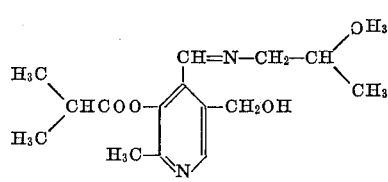

4 - [N-(2-methylpropyl)formimidoyl] - 5 - hydroxy-6-methyl-3-pyridinemethanol (9 g.) was dissolved in a mixture of pyridine (11 g.) and chloroform (140 cc.). To this solution was added dropwise isobutyryl chloride (5.3 g.) with stirring at 3° C. taking 5 minutes. The mixture was stirred at 3–11° C. for an hour and allowed to stand at room temperature for 48 hours. After the reaction was completed, the reaction mixture was poured into ice-water (500 cc.). The chloroform layer was separated out and washed with water, a 10% sodium bicarbonate solution, and further with water, after which the solvent was distilled off under reduced pressure.

The residue was dissolved in chloroform and dried over anhydrous magnesium sulfate. The solvent was distilled off under reduced pressure. The remaining oil was chromatographed through a column packed with silica-gel using petroleum ether as a solvent to give 3-isobutyryl-methyl - 4 - [N - (2-methylpropyl)formimidoyl]-5-isobutyryloxy-6-methylpyridine (8.8 g.) as white refine needles melting at 89° C.

Infra-red absorption spectrum: 1753 cm.$^{-1}$ (overlap) (>CO).

*Analysis.*—Calculated for $C_{20}H_{30}O_4N_2$ (percent): C, 66.27; H, 8.34; N, 7.73. Found (percent): C, 66.17; H, 8.49; N, 7.51.

Further, the column was treated with a mixture of benzene and methanol as a solvent to obtain 4-[N-(2-methylpropyl)formimidoyl] - 5 - isobutyryloxy-6-methyl-3-pyridinemethanol (1.2 g.) as a yellow oil.

Infra-red absorption spectrum: 1730 cm.$^{-1}$ (>CO); 3300 cm.$^{-1}$ (OH).

*Analysis.*—Calculated for $C_{16}H_{24}O_3N_2$ (percent): C, 65.72; H, 8.27; N, 9.58. Found (percent): C, 66.00; H, 8.65; N, 9.16.

The oil was treated with picric acid to give the picrate of 4-[N-(2-methylpropyl)formimidoyl]-5-isobutyryloxy-6-methyl-3-pyridinemethanol melting at 97–100° C.

Example (2)-8

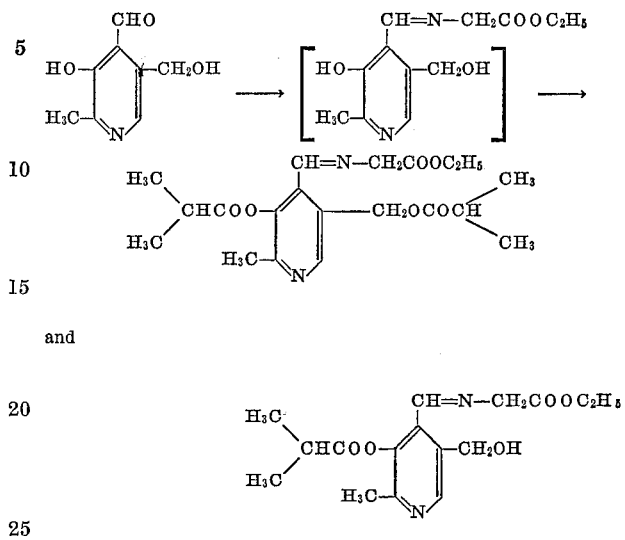

and

To a solution of pyridoxal hydrochloride (4.1 g.) in pyridine (50 cc.) was gradually added at room temperature, glycine ethyl ester (2.1 g.) and further triethylamine (5 cc.), and the mixture was stirred for 20 minutes. The mixture was cooled and added dropwise with a solution of isobutyryl chloride (4.3 g.) in ether (20 cc.) under stirring at −3–0° C. taking 30 minutes, and stirred for 10 minutes at the same temperature and for 2 hours at room temperature. After the reaction was completed, the reaction mixture was poured into ice-water (500 cc.) The precipitating crystals were filtrated (the filtrate was kept for the further treatment in (ii)), washed with a sodium bicarbonate solution and with water, and then recrystallized from 60% ethanol to give 3-isobutyryloxymethyl - 4 - (N-ethoxycarbonylmethylformimidoyl)-5-isobutyryloxy-6-methylpyridine (0.2 g.) as white flakes melting at 200° C.

*Analysis.*—Calculated for $C_{20}H_{28}O_6N_2$ (percent): C, 61.21; H, 7.19; N, 7.14. Found (percent): C, 60.98; H, 7.20; N, 7.18.

The filtrate obtained in the above filtration, was further extracted with chloroform. The chloroform layer was washed with water, a 10% sodium hydroxide solution and then with water. The solvent was distilled off under reduced pressure. The remaining oil was chromatographed through a column packed with silica-gel using petroleum ether as a solvent to give 4-(N-ethoxycarbonylmethylformimidoyl) - 5 - isobutyryloxy-6-methyl-3-pyridinemethanol (1.6 g.) as a yellow oil.

Infra-red absorption spectrum: 1740, 1752 cm.$^{-1}$ (>CO); 3340 cm.$^{-1}$ (OH).

Example (2)-9

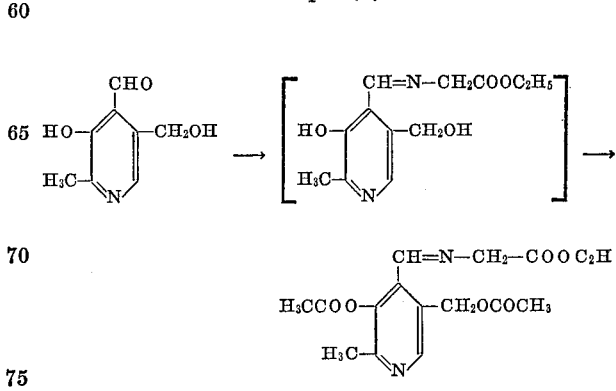

To a solution of pyridoxal hydrochloride (7.0 g.) in pyridine (85 cc.) was added gradually at 3° C. glycine ethyl ester (4.1 g.) and further triethylamine (5 cc.). The mixture was stirred at 3° C. for 2 hours and then added dropwise with a solution of acetyl chloride (3.3 g.) in ether (20 cc.) under stirring at 3° C. taking 10 minutes. The mixture was stirred at 3° C. for an hour and allowed to stand over night at room temperature. After the reaction was completed, the reaction mixture was poured into ice-water (800 cc.). The precipitating crystals were filtered off and the filtrate was extracted with chloroform. The chloroform solution was washed with water, a 2% sodium hydroxide solution and then with water, after which the solvent was distilled off. The obtained crystals were recrystallized from benzene to give 3-acetoxymethyl - 4 - (N-ethoxycarbonylmethylformimidoyl)-5-acetoxy-6-methylpyridine (1.2 g.) as white crystals melting at 166–167° C.

*Analysis.*—Calculated for $C_{16}H_{20}O_6N_2$ (percent): C, 57.13; H, 5.99; N, 8.33. Found (percent): C, 57.24; H, 5.92; N, 8.51.

STEP 3

This step is concerned with the conversion of pyridoxal (II) into 1,7-diacyloxy-1,3-dihydrofuro [3,4-c] pyridine derivatives (IV).

The conversion can be effected by reacting pyridoxal (II) or its acid addition salts with an acylating agent.

As specific examples of acid addition salts of pyridoxal there are exemplified organic and inorganic acid addition salts (e.g. hydrochloride, sulfate, acetate, propionate, etc.). For an acylating agent in the conversion it may be applied for the same as used in the disclosure on the Step 2 described before.

In the conversion, when using free pyridoxal as a starting compound, it is advantageous to effect the reaction under the presence of a condensing agent referred to in the disclosure on the Step 2. When using acid addition salts of pyridoxal, it is also recommendable to effect the reaction in the presence of a base such as hydroxides, carbonates and bicarbonates of alkali metals (e.g. sodium, potassium, etc.) or of alkaline earth metals (e.g. magnesium calcium, barium, etc.); aliphatic tertiary amines (e.g. trimethylamine, triethylamine, tripropylamine, tributylamine, dimethylethylamine, etc.); aromatic and heterocyclic amines (e.g. dimethylaniline, pyridine, pyrimidine, pyridazine, quinoline, isoquinoline, etc.) and the like. When the base is liquid, it can simultaneously play as a role of solvent.

In this reaction, it is preferable to use an acylating agent in the amount more than two mole to one mole of pyridoxal or its acid addition salts, though particularly not limited. The object compound in the conversion can be as well obtained by using an acylating agent in the amount less than two moles.

The reaction can be ordinally carried out in an inert solvent (e.g. ether, benzene, toluene, xylene, chloroform, carbon tetrachloride, chloromethan, petroleum ether, petroleum benzine, ligroin, tetrahydrofuran, dioxane, water, etc.). Water is recommendable to be used in a mixture of a hydrophilic solvent such as dioxan tetrahydrofuran, etc.

The 1,7-diacyloxy-1,3-dihydrofuro[3,4-c] pyridine derivatives (IV) obtained in this step may be converted into the corresponding inorganic or organic acid addition salts (e.g. hydrochloride, hydrobromide, sulfate, acetate, propionate, tartrate, succinate, etc.), according to the conventional method.

The compound (IV) may be used for the Step 4 in the form of a reaction mixture as just prepared without refinement.

The following examples are given for the illustration of the embodiment of the Step 3 in this invention.

EXAMPLE (3)-1

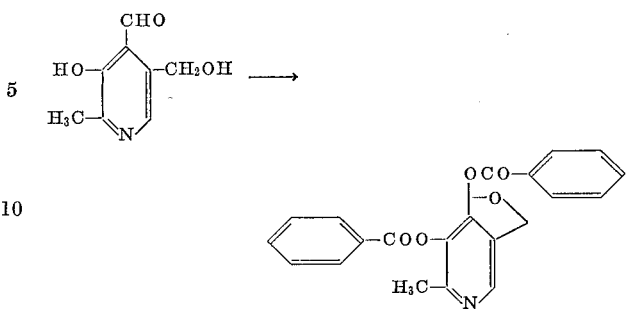

Pyridoxal hydrochloride (10.0 g.) was dissolved in a mixture of pyridine (250 cc.) and chloroform (100 cc.) and the solution was stirred under cooling. To this solution was added dropwise a solution of benzoyl chloride (28.0 g.) in chloroform (250 cc.) at 2–5° C. taking an hour stirred for an hour at room temperature.

After the reaction was completed, the reaction mixture was poured into ice-water (1000 cc.). The chloroform layer was separated out and washed with water, a 10% sodium hydroxide solution twice and then with water, after which the solvent was distilled off under reduced pressure. The residue was extracted with ether and the extract was dried over anhydrous magnesium sulfate, and the ether was distilled off under reduced pressure. The residue was crystallized from a mixture of ether and petroleum ether, and the precipitating crystals were recrystallized from a mixture of ether and ligroin and then washed with petroleum ether to give 1,7 - dibenzoyloxy-6 - methyl - 1,3 - dihydrofuro[3,4 - c]pyridine (16.0 g.) as white needles melting at 94–95.5° C.

*Analysis.*—Calculated for $C_{22}H_{17}O_5N$ (percent): C, 70.39; H, 4.57; N, 3.73. Found (percent): C, 70.41; H, 4.68; N, 3.77.

In the substantially same manner as Example (3)–1, there were obtained following compounds:

1,7 - di(p - toluyloxy) - 6 - methyl - 1,3 - dihydrofuro [3.4-c] pyridine, M.P. 121–122° C., 1,7-di-(p-chlorobenzoyloxy)-6-methyl-1,3-dihydrofuro[3,4-c] pyridine, M.P. 152–155° C.

EXAMPLE (3)-2

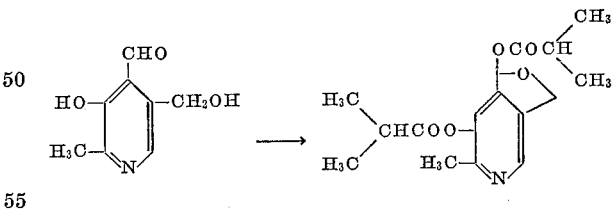

Pyridoxal hydrochloride (3.0 g.) was dissolved in a mixture of pyridine (72 cc.) and chloroform (30 cc.) and the solution was stirred under cooling. To this solution was added dropwise a solution of isobutyryl chloride (6.2 g.) in chloroform (72 cc.) at 2–5° C. taking 90 minutes and then stirred for an hour at room temperature. After the reaction was completed, the reaction mixture was poured into ice-water (500 cc.) The chloroform layer was separated out and washed with water, a 10% sodium hydroxide solution and then with water, after which the solvent was distilled off under reduced pressure. The residue was extracted with ether and the extract was dried over anhydrous magnesium sulfate. The solvent was distilled off under reduced pressure and the residue was recrystallized from 50% ethanol to give 1,7 - diisobutyryloxy - 6 - methyl - 1,3 - dihydrofuro [3,4-c] pyridine (3.9 g.) as white needles melting at 61–62° C.

*Analysis.*—Calculated for $C_{16}H_{21}O_5N$ (percent): C, 62.52; H, 6.88; N, 4.56. Found (percent): C, 62.59; H, 6.80; N, 4.50.

Example (3)-3

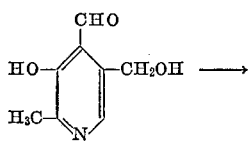

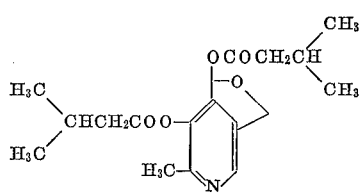

Pyridoxal hydrochloride (2.0 g.) was dissolved in a mixture of pyridine (48 cc.) and chloroform (20 cc.) and the solution was cooled. To this solution was added dropwise a solution of 3-methylbutyryl chloride (4.7 g.) in chloroform (20 cc.) under stirring at 2-5° C. taking 40 minutes. The reaction mixture was stirred for 3 hours at room temperature and then poured into ice-water (100 cc.). The chloroform layer was separated out and washed with water, a 10% sodium hydroxide solution (100 cc.) and then with water, after which the solvent was distilled off under reduced pressure. To the residue was added a small amount of water and the pyridine remaining in it was azeotropically distilled off with the water completely. The residue was dissolved in ether and the ether solution was dried over anhydrous magnesium sulfate. The ether was distilled off to give an oily substance. This oily substance was chromatographed through a column packed with silica-gel using benzene as a solvent, to obtain 1,7 - di(3 - methylbutyryloxy) - 6 - methyl-1,3-dihydrofuro[3,4-c]pyridine (1.3 g.) as a yellow oil.

*Analysis.*—Calculated for $C_{18}H_{25}O_5N$ (percent): C, 64.46; H, 7.51; N, 4.18. Found (percent): C, 64.26; H, 7.65; N, 4.19.

Example (3)-4

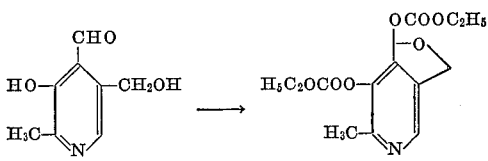

To a solution of pyridoxal hydrochloride (2.0 g.) in pyridine (24 cc.) was added dropwise a solution of ethyl chloroformate (4.3 g.) in ether (48 cc.) under stirring at −1-0° C. taking an hour. The mixture was stirred for 2 hours at room temperature. After the reaction was completed, the reaction mixture was poured into ice-water (200 cc.) and the ether layer was separated out. The water layer was extracted with ether and the ether extract was jointed to the ether layer. Thus obtained ether solution was washed with water, a sodium bicarbonate saturated aqueous solution and then with water in order, and dried over anhydrous sodium sulfate, after which the sodium sulfate was filtered off. The filtrate was distilled off under reduced pressure to give 1,7 - diethoxycarbonyloxy - 6 - methyl - 1,3 - dihydrofuro[3,4-c]pyridine (2.5 g.) as a yellow oil.

Infra-red absorption spectrum: 1760, 1768 cm.$^{-1}$ (>CO).

In the substantially same manner as Examples (3)-2 to (3)-3 there were obtained following compounds.

1,7-diacetoxy-6-methyl-1,3-dihydrofuro[3,4-c]pyridine, white needles, M.P. 98–99° C., 1,7-dipropionyloxy-6-methyl-1,3-dihydrofuro[3,4-c]pyridine, white needles, M.P. 58–60° C., 1,7-dicaproyloxy-6-methyl-1,3-dihydrofuro[3,4-c]pyridilne hydrochloride, white crystals, M.P. 120.5–121.5° C. (decomp.), 1,7-diacryloxy-6-methyl-1,3-dihydrofuro[3,4-c]pyridine, M.P. 140–145° C., 1,7-dibutyryloxy-6-methyl-1,3-dihydrofuro[3,4-c]pyridine, yellow oil, Infra-red absorption spectrum: 1750, 1770 cm.$^{-1}$ (—COO—).

STEP 4

The step is concerned with the conversion of 1,7-diacyloxy - 1,3 - dihydrofuro[3,4-c]pyridine derivatives (IV) or their acid addition salts into 1 - acyloxy - 7 - hydroxy - 1,3 - dihydrofuro[3,4-c]pyridine derivatives (V).

The conversion can be effected by hydrolyzing the starting compounds of 1,7 - diacyloxy - 1,3 - dihydrofuro[3,4-c]pyridine derivatives (IV) or their acid addition salts.

The hydrolysis reaction can be enough carried out in the presence of water. In order to shorten reaction time, may be applied an accelerator such as an acid catalyst [e.g. an inorganic acid (hydrochloric acid, sulfuric acid, nitric acid, etc.), an organic acid (e.g. acetic acid, propionic acid, benzene sulfonic acid, p-toluene sulfonic acid, 4-bromobenzene sulfonic acid, etc.) and the like], or a base catalyst [e.g. a hydroxide, carbonate and bicarbonate of an alkali metal (sodium, potassium, etc.) and of an alkaline earth metal (magnesium, calcium, etc.), trialkylamine (e.g. trimethylamine, triethylamine, etc.), pyridine, piperizine, pyrrolidine, morpholine, and the like].

The reaction is normally effected in water, but there may be used other inert solvents (methanol, ethanol, acetone, chloroform, benzene, toluene, xylene, tetrahydrofuran, dioxane, chloromethane, dichloroethane, hexane, ligroin, etc.).

The reaction temperature is not particularly limited and can be decided dependently by the starting compound (IV) or an accelerator to be used. The reaction is normally effected under cooling or warming, or at room temperature in a comparatively short time.

When the reaction is laid in a severe condition as taking reaction temperature higher and/or reaction time longer, the object compound of 1 - acyloxy - 7 - hydroxy-1,3 - dihydrofuro[3,4-c]pyridine derivatives (V) is further hydrolyzed to give the corresponding 1,7 - dihydroxy compounds. Therefore, it is recommendable to effect the reaction under a relatively moderate condition.

The compound (V) prepared by the reaction can be introduced into the corresponding inorganic or organic acid addition salt (e.g. hydrochloride, hydrobromide, sulfate, acetate, propionate, tartrate, succinate, etc.), according to the conventional method.

The compound (V) may be used for the Step 5 in the form of a reaction mixture as just prepared without refinement.

The compound (V) or its acid addition salt obtained in this step can be converted, according to the acylation referred to the disclosure on the Steps 2 and 3, into the corresponding 1,7 - diacyloxy-1,3-dihydrofuro[3,4-c]pyridine derivatives in which the acyl radicals at 1st and 7th positions are each different.

The compound (V) may be used for the step in the form of a reaction mixture as just prepared without refinement.

The following examples are given for the illustrative of the embodiment of the Step 4 in this invention.

Example (4)-1

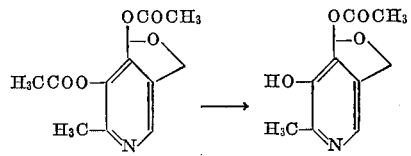

To a solution 1,7-diacetoxy-6-methyl-1,3-dihydrofuro[3,4-c]pyridine (1.0 g.) in chloroform (100 cc.), was added under cooling a solution of pyridine (20 cc.) containing 1 N hydrochloric acid (8 cc.), and the mixture was stirred for 3 minutes. After the reaction was completed, the reaction mixture was poured into ice-water (100 cc.). The chloroform layer was separated out and washed with water and sodium bicarbonate saturated aqueous solution and then with water, after which the solvent was distilled off to give 1-acetoxy-6-methyl-7-hydroxy-1,3-dihydrofuro[3,4-c]pyridine (0.7 g.) as white crystals melting at 179–180° C.

*Analysis.*—Calculated for $C_{10}H_{11}O_4N$ (percent): C, 57.41; H, 5.30; N, 6.70. Found (percent: C, 57.48; H, 5.17; N, 6.87.

Example (4)–2

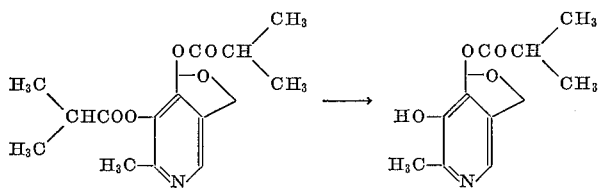

Into a solution of 1,7-diisobutyryloxy-6-methyl-1,3-dihydrofuro[3,4-c]pyridine (1.0 g.) in ether (100 cc.) was introduced undried hydrogen chloride gas. The precipitating crystals were collected by filtration and dissolved in acetone. The acetone solution was added with petroleum ether and the precipitating crystals were collected by filtration to give 1-isobutyryloxy-6-methyl-7-hydroxy-1,3-dihydrofuro[3,4-c]pyridine hydrochloride (0.9 g.) as white crystals decomposing at 156–157° C.

*Analysis.*—Calculated for $C_{12}H_{16}NO_4Cl$ (percent): C, 52.65; H, 5.89; N, 5.12; Cl, 12.96. Found (percent): C, 52.87; H, 5.96; N, 5.28; Cl, 13.18.

Example (4)–3

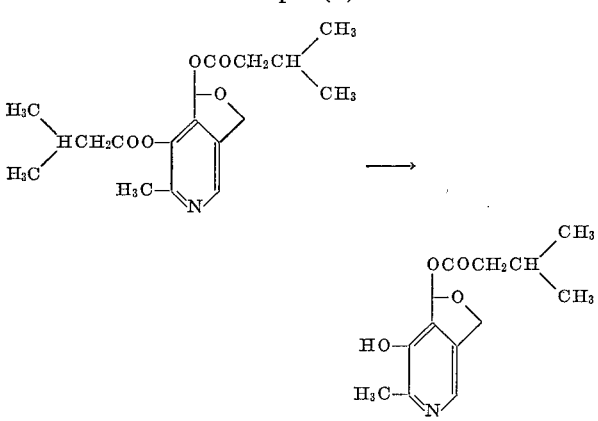

Into a solution of 1,7-di(3-methylbutyryloxy)-6-methyl-1,3-dihydrofuro[3,4-c]pyridine (6.0 g.) in ether (30 cc.) was introduced undried hydrogen chloride gas under cooling. The precipitating crystals were collected by filtration and dissolved in acetone. To the acetone solution was added petroleum ether to give crystals of 1-(3-methylbutyryloxy)-6-methyl-7-hydroxy-1,3-dihydro[3,4-c]pyridine hydrochloride (2.0 g.) as white crystals melting at 124–125° C.

*Analysis.*—Calculated for $C_{13}H_{18}O_4NCl$ (percent): C, 54.26; H, 6.30; N, 4.87; Cl, 12.32. Found (percent): C, 54.14; H, 6.43; N, 4.34; Cl, 12.48.

Example (4)–4

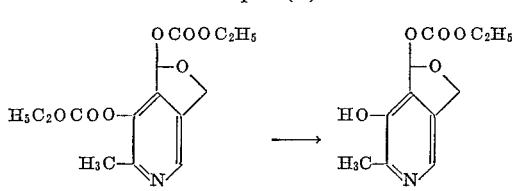

(i) To 1,7-ethoxycarbonyloxy-6-methyl-1,3-dihydrofuro[3,4-c]pyridine (2.5 g.) was added water (10 cc.) and the mixture was warmed at 50° C. for 30 minutes. After the reaction was completed, the reaction mixture was condensed under reduced pressure and the residue was treated with a mixture of petroleum ether and ether. The precipitating crystals were dissolved in 2-ethoxyethanol and to the solution was added the same volume of petroleum ether as 2-ethoxyethanol and a small amount of ether to give 1-ethoxycarbonyloxy-6-methyl-7-hydroxy-1,3-dihydrofuro[3,4-c]pyridine (0.5 g.) as white crystals decomposing at 176–177.5° C. which was converted into the hydrochloride, white crystals, M.P. 154–156° C. (decomp.).

*Analysis.*—Calculated for $C_{11}H_{13}O_5N$ (percent): C, 55.23; H, 5.48; N, 5.86. Found (percent): C, 55.40; H, 5.58; N, 5.93.

(ii) To 1,7 - diethoxycarbonyloxy - 6-methyl-1,3-dihydrofuro [3,4-c] pyridine (2.0 g.) were added water (10 cc.) and pyridine (1 cc.), and the mixture was warmed at 40° C. for 30 minutes. After the reaction was completed, the reaction mixture was condensed and the residue was treated in the same manner as described in (i) of this example to give 1-ethoxycarbonyloxy-6-methyl-7-hydroxy-1,3-dihydrofuro [3,4-c] pyridine (0.3 g.), the infrared absorption spectrum of which completely agreed with that of 1 - ethoxycarbonyloxy-6-methyl-7-hydroxy-1,3-dihydrofuro [3,4-c] pyridine obtained in (i) above.

Example (4)–5

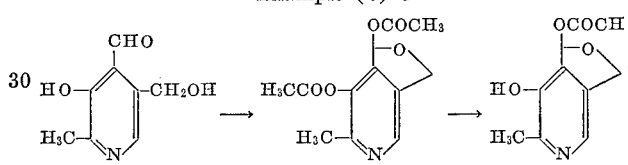

Pyridoxal hydrochloride (2.0 g.) was dissolved in a mixture of pyridine (50 cc.) and chloroform (20 cc.) and the solution was stirred under cooling with an ice. To this solution was added dropwise a solution of acetyl chloride (1.7 g.) in chloroform (50 cc.) at 3–5° C. taking an hour. The mixture was further stirred for an hour at room temperature. The reaction mixture containing 1,7-diacetoxy-6-methyl-1,3-dihydrofuro [3,4-c] pyridine was poured into ice-water. The chloroform was washed with water, a sodium bicarbonate saturated aqueous solution, and further with water, and the solvent was condensed under reduced pressure, while the hydrolysis was effected. After the reaction was completed, the residue was recrystallized from acetone and then petroleum ether to give 1-acetoxy-6-methyl-7-hydroxy-1,3-dihydrofuro [3,4-c] pyridine (1.4 g.) as white crystals melting at 179–180° C., which showed no depression of melting point in the mixed examination with the compound obtained in Example (4)–1.

Example (4)–6

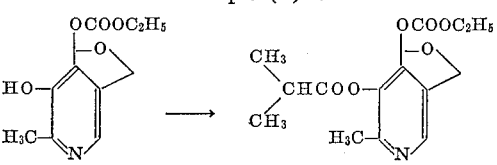

1 - ethoxycarbonyloxy - 7-hydroxy-6-methyl-1,3-dihydrofuro [3,4-c] pyridine hydrochloride (5.0 g.) was dissolved in a mixture of pyridine (70 cc.) and chloroform (50 cc.) and the solution was stirred under ice-cooling. To this solution was added dropwise a solution of isobutyryl chloride (3.9 g.) in chloroform (30 cc.) at 30° C. taking 40 minutes. The mixture was stirred at 30° C. for 30 minutes and at room temperature for 80 minutes. The reaction mixture was poured into ice-water (500 cc.) and the chloroform layer was separated out.

The chloroform layer was washed with a sodium bicarbonate saturated aqueous solution twice and further with water, after which the solvent was distilled off under reduced pressure. The remainder was extracted with ether, After drying, the ether was distilled off under reduced pressure. The remainder was dissolved in dried ether and to this solution was added 10% hydrochloric acid ethanol solution to give crystals. These crystals were collected by filtration to obtain 1-ethoxycarbonyl-7-isobutyryloxy-6-methyl-1,3-dihydrofuro [3,4-c] pyridine hydrochloride (3.5 g.) as white crystals melting at 125–126° C. (decomp.).

*Analysis.*—Calculated for $C_{15}H_{20}O_6Cl$ (percent): C, 52.10; H, 5.83; N, 4.05. Found (percent): C, 51.72; H, 6.04; N, 4.18.

STEP 5

This step is concerned with the conversion of 1-acyloxy - 7 - hydroxy-1,3-dihydrofuro [3,4-c] pyridine derivatives (V) or their acid addition salts into 4-formimidoyl-5-acyloxy-3-pyridinemethanol derivatives (I)'.

The conversion can be effected by reacting 1-acyloxy-7-hydroxy-1,3-dihydrofuro [3,4-c] pyridine derivatives (V) with a primary organic amine or its acid addition salts in an alkaline condition.

The reaction is considered to proceed through the following mechanism.

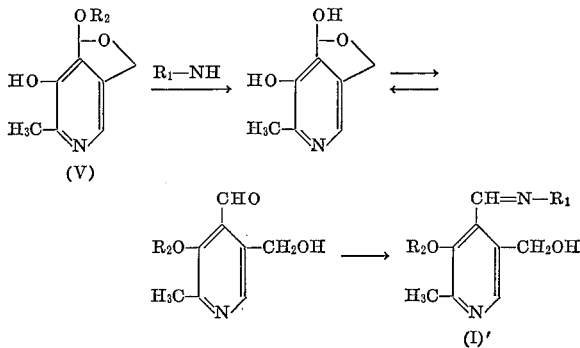

Such reaction has ever been unknown hereto.

A primary organic amine of the formula: $R_1$ —NH wherein $R_1$ is as defined before, may be illustrative as follows:

Primary alkyl amine, in which the alkyl is substituted or unsubstituted with carboxy, lower alkoxy, lower alkylthio, lower alkoxycarbonyl, aryl, carbamoyl or 5- or 6- membered heterocyclyl containing one or two hetero atom(s) selected from the group consisting of N, O and S (e.g. methylamine, ethylamine, propylamine, isopropylamine, butylamine, 2-methylpropylamine, pentylamine 3-methylbutylamine, hexylamine, heptylamine, octylamine, glycine, alanine, 3-aminopropionic acid, 4-aminobutyric acid, 5-aminocapric acid, 2-methoxymethylamine, 3-methoxypropylamine, 2-ethoxyethylamine, 3 - ethoxypropylamine, 2 - methylthioethylamine, 3 - methylthiopropylamine, 2 - ethyl thioethylamine, 3 - ethylthiopropylamine, glycine methyl ester, glycine ethyl ester, glycine propyl ester, methyl 3 - aminopropionate, ethyl 3 - aminopropionate, benzylamine, phenethylamine, aminoacetoamide, 1 - aminopropionamide, furfurylamine, 2 - aminomethylpyridine, 3 - (2 - aminoethyl) pyrazole, 5 - (2 - aminoethyl) - 4 - methyloxazole, 2 - thenylamine, 4 - aminomethyl-2-methylthiazole, etc.).

Primary arylamine substituted or unsubstituted with carboxy, lower alkyl, lower alkoxy, lower alkylthio, lower alkoxycarbonyl, carbamoyl or halogen (e.g. aniline, α- or β-naphthylamine, p-aminobenzoic acid, o-, m- or p-toluidine, o- or p-methoxyaniline, o- or p-ethoxyaniline, o- or p-methylthioaniline, o- or p-ethylthioaniline, methyl p-aminobenzoate, ethyl p-aminobenzoate, propyl p-aminobenzoate, o-, m- or p-chloroaniline, etc.).

As an acid addition salt of the primary organic acid addition salt, are exemplified the inorganic or organic acid addition salt e.g. hydrochloride, hydrobromide, picrate, acetate, propionate, tartrate, succinate, etc.).

When a primary organic amine to be used, is of weak alkalinity or the acid addition salt, it is desired to use, in order to adjust the reaction mixture to alkaline condition, an alkaline agent such as an organic and inorganic base (e.g. lithium hydroxide, sodium hydroxide, potassium hydroxide, sodium carbonate, potassium carbonate, sodium bicarbonate, potassium bicarbonate, magnesium hydroxide, calcium hydroxide, calcium oxide, triethylamine, pyridine, etc.).

The reaction can be effected in water normally or in an inert organic solvent (e.g. methanol, ethanol, dioxane, tetrahydrofuran, chloroform, chloromethane, dichloroethane, benzene, hexane, ligroin, etc.)

The reaction temperature is not particularly limited but the reaction is often carried out at relatively lower temperature than room temperature.

The 4-formimidoyl-5-acyloxy-3-pyridinemethanol derivatives (I') obtained in this step can be converted into the corresponding inorganic or organic acid addition salts (e.g. hydrochloride, hydrobromide, sulfate, acetate, propionate, tartrate, succinate, etc.), according to the conventional method.

The compound (I') may be used for the Step 6 in the form of a reaction mixture as just prepared without refinement.

The following examples are given to illustrate the embodiment of the Step 3 in this invention.

Example (5)–1

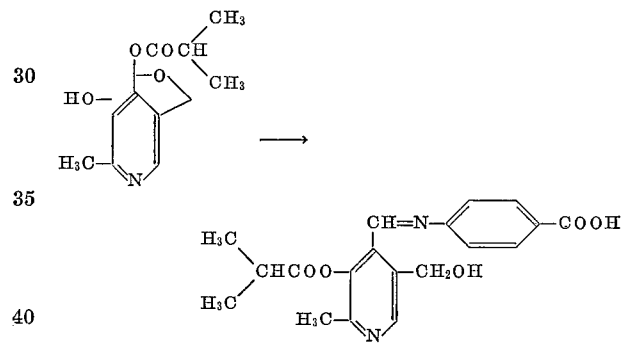

To a solution of 1-isobutyryloxy-6-methyl-7-hydroxy-1,3-dihydrofuro [3,4-c] pyridine hydrochloride (1.0 g.) in water (5 cc.), was added dropwise p-aminobenzoic acid (0.5 g.) in 95% ethanol under ice-cooling with stirring, taking 10 minutes. The reaction mixture was added with a 5% sodium bicarbonate aqueous solution to adjust a pH to 8.0, and stirred for 30 minutes. The precipitating crystals were collected by filtration and washed with water. These crystals were recrystallized from dioxane to give 4-[N - (p - carboxyphenyl)formimidoyl]-5-isobutyryloxy-6-methyl-3-pyridinemethanol (0.8 g.) as refined white needles decomposing at 247° C.

*Analysis.*—Calculated for $C_{19}H_{10}O_5N_2$ (percent): C, 64.03; H, 5.66; N, 7.86. Found (percent): C, 64.20; H, 5.60; N, 8.08.

Example (5)–2

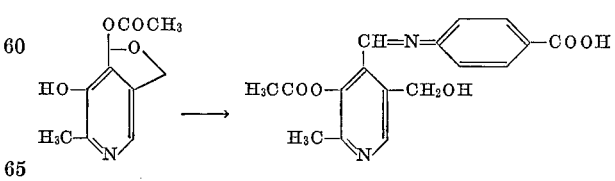

To a solution of 1-acetoxy-6-methyl-7-hydroxy-1,3-dihydrofuro [3,4-c] pyridine hydrochloride (1.0 g.) in water (5 cc.) was added dropwise a solution of p-aminobenzoic acid (0.6 g.) in 95% ethanol (6 cc.) under ice-cooling with stirring, taking 10 minutes. The mixture was treated with the same manner as described in Example (5)–1 to obtain crystals. These crystals were recrystallized from 2-ethoxyethanol to give 4-[N-(p-carboxyphenyl)formimidoyl]-5-acetoxy-6-methyl-3-pyridinemethanol (0.8 g.) decomposing at 230° C.

Infra-red absorption spectrum (nujol): 1788 cm.$^{-1}$ (>C=O of the acetoxy at the 5th position); 1680 cm.$^{-1}$ (>C=O of the carboxy); 1610 cm.$^{-1}$ (benzene).

Example (5)–3

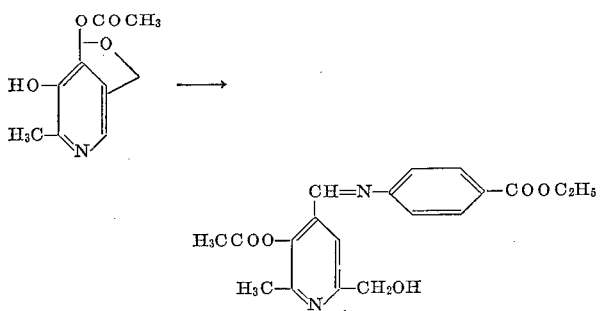

To a solution of 1-acetoxy-6-methyl-7-hydroxy-1,3-dihydrofuro [3,4-c] pyridine hydrochloride (1.0 g.) in water (5 cc.) was added dropwise a solution of ethyl p-aminobenzoate (0.7 g.) in 95% ethanol (3 cc.) under cooling taking 3 minutes. The mixture was added with a 5% sodium bicarbonate aqueous solution to adjust a pH to 8.0 and stirred for 30 minutes. The reaction mixture was treated with the same manner as described in Example (5)–1 to give 4-[N-(p-ethoxycarbonylphenyl)-formimidoyl]-5-acetoxy-6 - methyl - 3 - pyridinemethanol (0.9 g.) as refined white needles melting at 163–164° C.

In the substantially same manner as Example (5)–1 to (5)–3, the following compound is obtained.

4-[P-(P-ethoxycarbonylphenyl)formimidoyl] - 5 - isobutyryloxy-6-methyl-3 - pyridinemethanol, white needles, M.P. 172–173° C., infra-red absorption spectrum;

1610 cm.$^{-1}$ 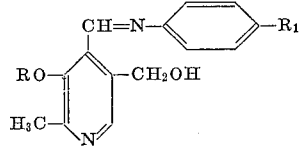, 1690 cm.$^{-1}$ (>CO in —COOC$_2$H$_5$)

1769 cm.$^{-1}$ (>CO in —COOCH(CH$_3$)$_2$), 3380 cm.$^{-1}$ (OH)

STEP 6

This step is concerned to acylation or phosphorylation of the hydroxymethyl radical at the 3rd position of 4-formimidoyl-5-acyloxy-3-pyridinemethanol derivatives (I)' or its acid addition, to give the corresponding 3-acyloxy- or phosphonoxy-methyl-4-formimidoylpyridine derivatives (I)".

The conversion can be effected by reacting the compound (I)' or its acid addition salt with an acylating or phosphorylating agent.

The acylating agent used in the reaction can be referred to the disclosure in the Step 2, and the acylation of the compound (I)' can be also effected in the substantially same manner as disclosed in the Step 2.

In the phosphorylation of the compound (I)', are used, as a phosphorylating agent, a mixture of phosphoric acid and phosphorous pentachloride, polyphosphoric acid, monochlorophosphoric acid [(HO)$_2$POCl], diphenyl phosphochloridate [(C$_6$H$_5$O)$_2$POCl], dibenzyl phosphochloridate [(C$_6$H$_5$CH$_2$O)$_2$POCl], etc. When the chloride of the phosphorylating agent, it is recommendable, according to necessity, to use a dehydrating agent such as pyridine, trialkylamine (e.g. trimethylamine, triethylamine, etc.) and the like. In case the phosphorylating agent and/or the dehydrating agent is liquid, it can simultaneously play the role of solvent. As a solvent, is normally used an inert solvent such as ether, benzene, toluene, xylene, chloroform, carbon tetrachloride, chloromethane, dichloromethane, petroleum ether, petroleum benzine, ligroin, etc.

The reaction temperature of the phosphorylation may be dependently decided by the starting compound (I)' and/or the phosphorylating agent to be used, though not particularly limited.

When using diphenyl phosphochloridate or dibenzyl phosphochloridate, is obtained the corresponding 3-diphenylphosphonoxy- or dibenzylphosphonoxy-methyl-4-formimidoylpyridine derivatives as an intermediate, which is subjected to catalytic reduction to give the corresponding 3-phosphonoxy-methyl-4-formimidoylpyridine derivatives (I)". In the catalytic reduction, can be used, as a catalyst, palladium or nickel which may be adequately chosen by the kind of the intermediate to be subject to the catalytic reduction.

The 3-acyloxy- or phosphonoxy-methyl-4-formimidoylpyridine derivatives (I)" obtained in this step can be converted into the corresponding inorganic or organic acid addition salts (e.g. hydrochloride, hydrobromide, sulfate, acetate, propionate, tartrate, succinate, etc.), according to the conventional method.

We claim:

1. A compound of the formula

RO—[pyridine with CH=N—phenyl—R$_1$, CH$_2$OH, H$_3$C, N]

wherein

R is hydrogen or lower alkanoyl, and
R$_1$ is hydrogen or carbethoxy, with the proviso that when R$_1$ is hydrogen, R is lower alkanoyl.

2. A compound according to claim 1 wherein R$_1$ is carbethoxy.

3. A compound according to claim 2 wherein R is lower alkanoyl.

4. A compound according to claim 3 wherein R is acetyl.

5. A compound according to claim 3 wherein R is isobutyryl.

6. A compound according to claim 1 wherein R is isobutyryl and R$_1$ is hydrogen.

7. A compound according to claim 2 wherein R is hydrogen.

References Cited

UNITED STATES PATENTS

| | | | |
|---|---|---|---|
| 2,540,946 | 2/1951 | Hoffman | 260—40 |
| 2,583,774 | 1/1952 | Hoffman | 260—294.9 |
| 2,683,716 | 7/1954 | Winsten | 260—240 |

FOREIGN PATENTS

| | | | |
|---|---|---|---|
| 18,749 | 8/1965 | Japan | 260—240 |
| 26,820 | 11/1965 | Japan | 260—240 |

OTHER REFERENCES

Heyl et al.: J. Am. Chem. Soc. vol. 70, pages 3669 to 3671 (1948); Heyl et al.: J. Am. Chem. Soc. vol. 73, pages 3434 to 3435 (1951); Heyl et al.: J. Am. Chem. Soc. vol. 74, pages 414 to 416 (1952).

Metzler: J. Am. Chem. Soc. vol. 79, pages 485 to 490 (1957).

Buell et al.: J. Am. Chem. Soc. vol. 82, pages 6042 to 6049 (1960).

JOHN D. RANDOLPH, Primary Examiner

U.S. Cl. X.R.

260—247.1, 247.5, 268, 294.8, 295, 295.5, 296, 297; 424—263